(12) United States Patent
Nishimura et al.

(10) Patent No.: US 8,022,806 B2
(45) Date of Patent: Sep. 20, 2011

(54) FLUID PRESSURE SENSOR PACKAGE

(75) Inventors: Kazuaki Nishimura, Matsusaka (JP); Naoki Yahata, Watarai-gun (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 502 days.

(21) Appl. No.: 12/194,385

(22) Filed: Aug. 19, 2008

(65) Prior Publication Data

US 2009/0051479 A1 Feb. 26, 2009

(30) Foreign Application Priority Data

Aug. 24, 2007 (JP) ................. 2007-219044

(51) Int. Cl.
  *H01C 10/10* (2006.01)
(52) U.S. Cl. ............................. 338/42; 73/753
(58) Field of Classification Search .......... 338/42; 73/721, 753–754
  See application file for complete search history.

(56) References Cited

U.S. PATENT DOCUMENTS

| | | | |
|---|---|---|---|
| 6,577,224 B2 * | 6/2003 | Kurtz ................ | 338/42 |
| 6,880,405 B2 * | 4/2005 | Mouhebaty et al. ........ | 73/723 |
| 7,143,651 B2 * | 12/2006 | Sasaki et al. ............ | 73/721 |
| 7,275,444 B1 * | 10/2007 | Kurtz et al. ............ | 73/716 |
| 2002/0033050 A1 | 3/2002 | Shibata et al. | |
| 2003/0221492 A1 | 12/2003 | Yoshida et al. | |
| 2005/0061080 A1 | 3/2005 | Sasaki et al. | |

FOREIGN PATENT DOCUMENTS

| | | |
|---|---|---|
| CN | 1573309 A | 2/2005 |
| CN | 1614374 A | 5/2005 |
| EP | 0 497 534 A2 | 8/1992 |
| JP | 09-250964 A | 9/1997 |
| JP | 2003-14568 A | 1/2003 |

OTHER PUBLICATIONS

Notice to Submit a Response for the Application No. 10-2008-0082335 from Korean Intellectual Property Office dated Jul. 29, 2010.
European Search Report for Application No. EP 08 01 4077 dated Nov. 9, 2010.
The First Office Action for the Application No. 200810144590.X from The State Intellectual Property Office of the People's Republic of China dated Nov. 6, 2009.

* cited by examiner

*Primary Examiner* — Kyung Lee
(74) *Attorney, Agent, or Firm* — Cheng Law Group, PLLC

(57) ABSTRACT

A fluid pressure sensor package can be easily assembled to have different types of probe tubes depending upon different application environments. The sensor package includes a sealed casing accommodating a sensor chip for sensing a pressure of a fluid introduced into the casing. A probe tube extends from the casing for introducing the fluid into contact with the sensor chip. The casing has a top opening, and has a side wall formed on its interior surface with a stepped shoulder for bearing a flange at the lower end of the probe tube. The flange is sealingly bonded to the sidewall of the casing by a sealer. Since the probe tube is prepared as a separate member from the casing, the casing can be a common base for various probe tubes having fluid channels of different lengths or diameters.

8 Claims, 7 Drawing Sheets

FIG. 1
FIG. 2
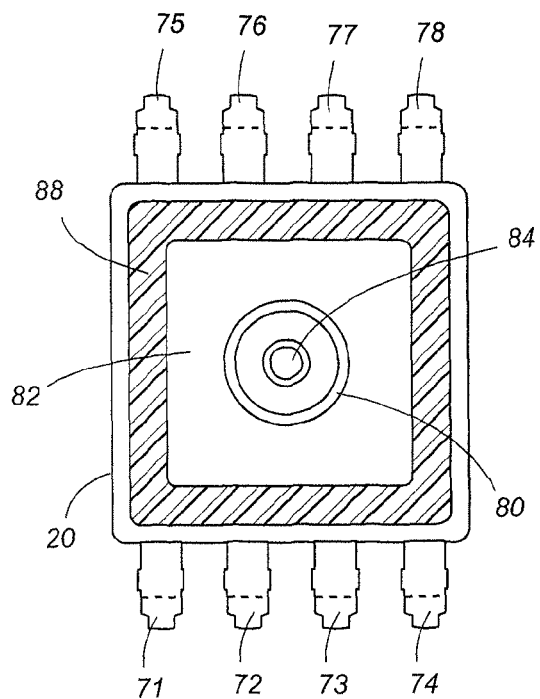
FIG. 3
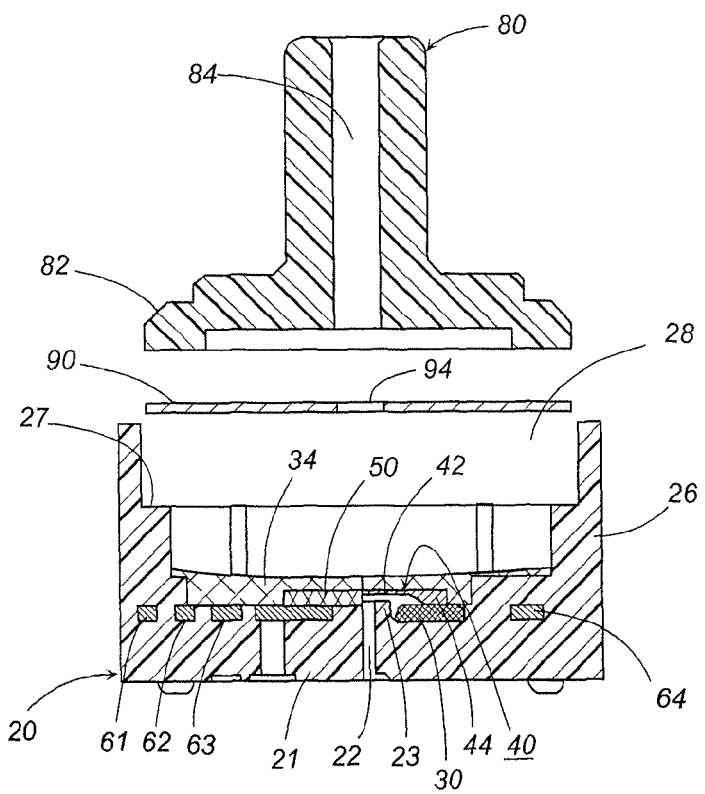

FLUID PRESSURE SENSOR PACKAGE

TECHNICAL FIELD

The present invention is directed to a fluid pressure sensor package, and more particularly to such sensor package for pressure measurement of a fluid by use of a sensor chip formed from a semiconductor substrate.

BACKGROUND ART

Japanese patent publication No. 9-250964 A discloses a fluid pressure sensor package with a sensor chip formed from a semiconductor substrate such as a silicon substrate. The sensor chip is designed to include a diaphragm and a sensing element which converts a mechanical stress into an electric signal. The sensor chip is accommodated within a casing with its diaphragm exposed to a fluid introduced through a probe tube integrally extending from the casing. The probe tube has a fluid channel for introducing the fluid into contact with the diaphragm. The fluid channel is designed to have a length and a diameter specific to a target fluid as well as a practical application environment. Since the probe tube is molded integrally with the casing, various sensor packages having differently shaped probe tubes have to be prepared for different application environments.

DISCLOSURE OF THE INVENTION

In view of the above shortcoming, the present invention has been achieved to provide a fluid pressure sensor package which can be easily assembled to have different types of probe tubes depending upon different applications. The sensor package in accordance with the present invention includes a sealed casing and a sensor chip accommodated in the casing. The sensor chip is formed of a semiconductor substrate to give a diaphragm and a sensing element for sensing a pressure of a fluid introduced into the casing. Extending from the casing is a probe tube which has a fluid channel for introducing the fluid into contact with the diaphragm. The casing is formed to have a bottom wall and a side wall which extends from the circumference of the bottom wall to define a top opening at an upper end of the casing. The side wall is formed on its interior surface with a stepped shoulder. The probe tube is formed at its one end with a flange which is fitted within the top opening of the casing and rests on the stepped shoulder. The flange is sealingly bonded to the sidewall of the casing by a sealer. Since the probe tube is prepared as a separate member from the casing, the casing can be a common base for various probe tubes having the fluid channels of different lengths or diameters. Accordingly, the sensor package can be assembled at a reduced cost while satisfying varying requirement for the dimensions of the probe tube.

Preferably, the sensor chip is bonded to the bottom wall of the casing by means of an adhesive. The bottom wall is formed with an air vent which communicates the diaphragm with an outside atmosphere for releasing a back pressure of the diaphragm. Formed on the interior surface of the bottom wall is a rim which surrounds the air vent to define a space outwardly thereof for receiving therein the adhesive. Thus, the adhesive can be retained in proper location while being prevented from leaking through the air vent for reliable bonding of the sensor chip on the bottom wall of the casing.

The rim may be shaped to have a planar contour which is analogous to that of the sensor chip such that the adhesive can be easily placed at a location for bonding the periphery of the diaphragm to the bottom wall.

The casing may be designed to additionally accommodate an IC module which is configured to process an output of the sensor chip and generate a signal indicative of the fluid pressure. For compact arrangement, the IC module and the sensor chip are arranged in side-by-side relation on the bottom wall along a first dimension of the casing. The casing is provided with a plurality of terminals which are arranged on opposite sides of the casing with regard to the first dimension and are electrically connected to the IC modules by means of individual leads embedded in the bottom wall. At least two of the terminals arranged adjacent to the sensor chip are electrically connected to the IC module by means of parallel leads which pass aside the sensor chip in parallel relation with each other. The bottom wall is provided with a recess which is configured to isolate the parallel leads in a constant spaced relation from each other. For realizing a compact structure of the sensor package, the parallel leads are closely packed in a relatively narrow region aside from the sensor chip, while being electrically isolated with each other as well as being embedded in the bottom wall without breaking a seal between the bottom wall and the leads. When molding the casing with the leads embedded therein by use of a molding die, a jig extends into the bottom wall in order to hold the parallel leads in position for embedding them into intend position. After molding the case, the jig is released to leave the recess in the bottom wall. Thus, by designing the casing to have the recess in the bottom wall at a portion corresponding to the parallel leads, the parallel leads can be successfully molded in the restricted region of the bottom wall of the casing as being electrically isolated with each other.

In this connection, the bottom wall is provided with two such recesses spaced along the length of the parallel leads, one being open to the interior of the casing, and the other being open to the exterior of the casing. Accordingly, when being molding in the casing, the associated jigs apply upward and downward force to the parallel leads at two longitudinally spaced points, respectively for pressing the parallel leads against complementary portions of the die. Whereby, the parallel leads of relatively long dimension can be successfully molded in the bottom wall of the casing as being electrically isolated with each other, yet causing no seal break through the bottom wall.

Further, the flange may be shaped to have a circular circumference in conformity with the top opening of the casing. In this version, a fixed dispenser can be utilized to apply the sealer to the periphery of the flange simply by rotating the casing around an axis of the probe tube.

These and still other advantageous features of the present invention will become more apparent from the following detailed description of preferred embodiments when taken in conjunction with the attached drawings.

BRIEF DESCRIPTION OF THE DRAWINGS

FIG. 1 is a front view of a fluid pressure sensor package in accordance with a first embodiment of the present invention;

FIG. 2 is a top view of the above sensor package;

FIG. 3 is an exploded sectional view of the above sensor package;

BEST MODE FOR CARRYING OUT THE INVENTION

Figure 4:
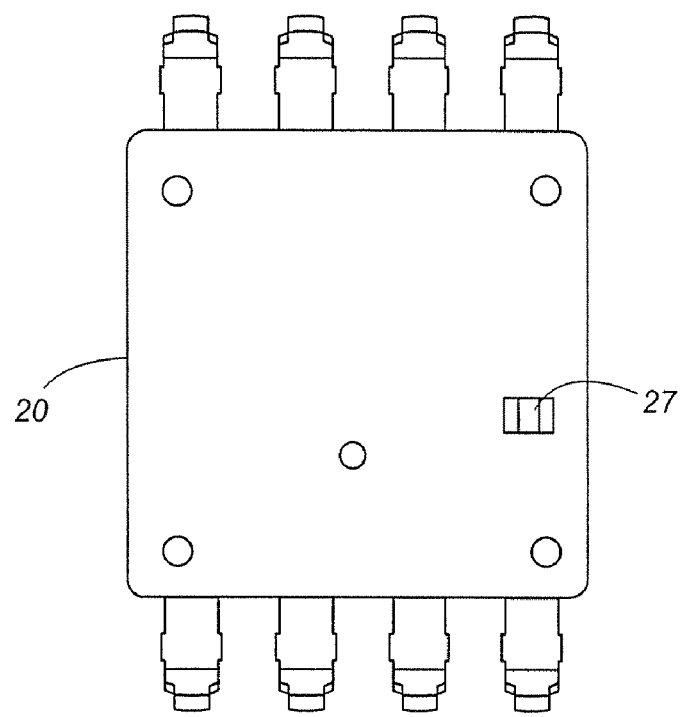
FIG. 4 is a bottom view of the above sensor package.
Figure 5:
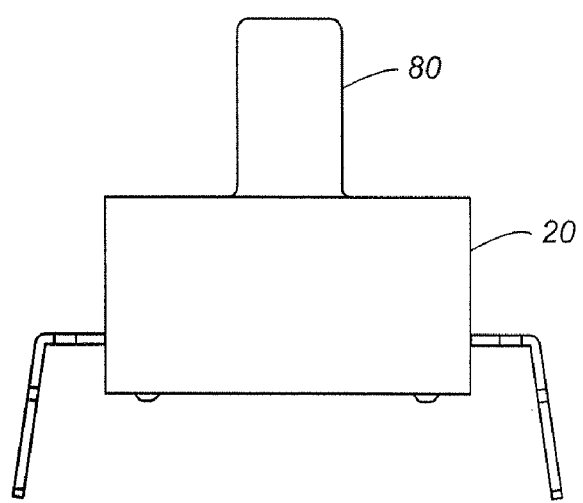
FIG. 5 is a side view of the above sensor package.

Referring now to FIGS. 1 to 5, there is shown a fluid pressure sensor package in accordance with a first embodiment of the present invention. The sensor package is basically composed of a casing 20 and a probe tube 80 which is formed separately from the casing 20 and is assembled thereto for introducing a target fluid into the casing. The casing 20 is molded from a plastic material into a top opened box with a bottom wall 21 and a side wall 26 upstanding from the periphery of the bottom wall to define a rectangular top opening 28 at an upper end of the casing. Accommodated within the casing 20 is a sensor chip 40 which is formed of a semiconductor substrate, for example, silicon to have a rectangular diaphragm 42 and a sensing element (not shown) composed of a plurality of piezo-electric resistors exhibiting varying resistance in proportion to an degree of deformation of the diaphragm being subject to the fluid introduced in the casing 20.

Figure 6:
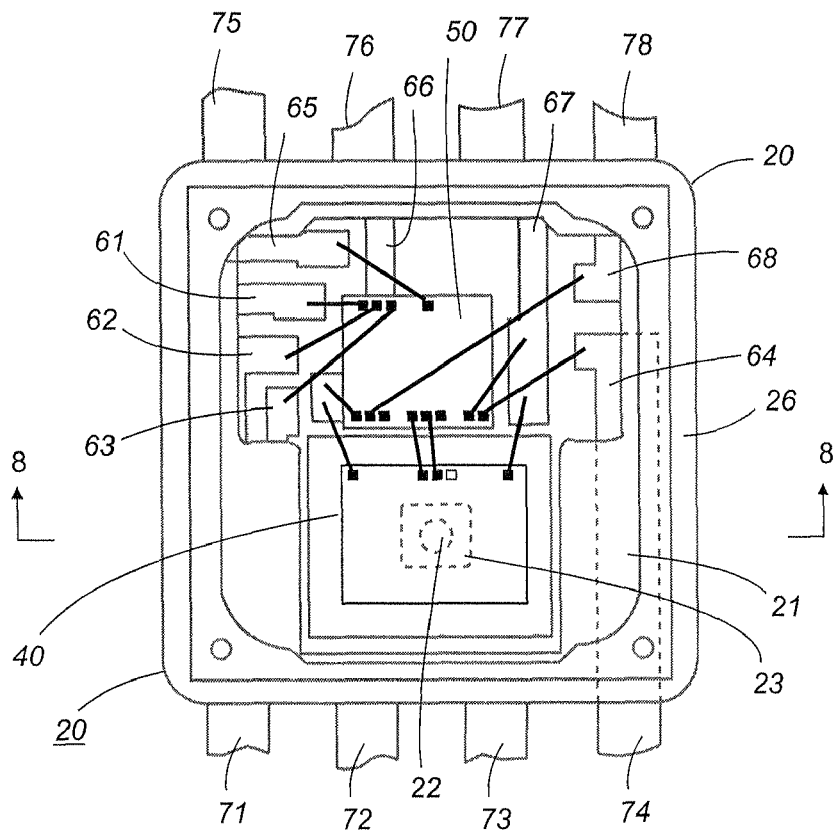
FIG. 6 is a top view of a casing utilized in the above sensor package.
Figure 7:
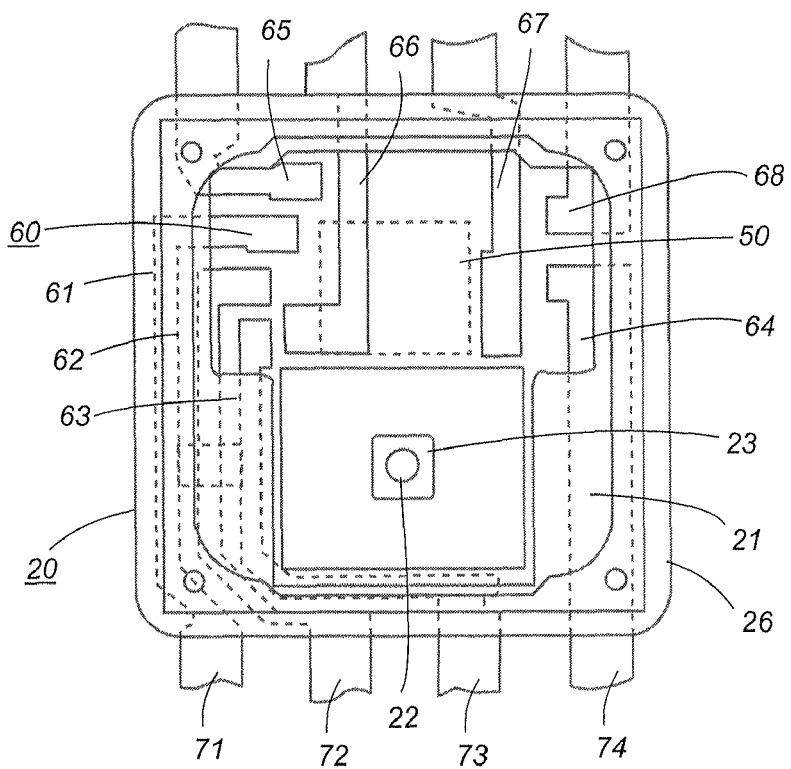
FIG. 7 is a top view of the casing shown with a sensor chip and an IC module removed therefrom.

The casing 20 also accommodates an IC module 50 which is configured to process an output, i.e., resistance from the sensor chip 40 to determine a pressure of the fluid. As shown in FIG. 6, the IC module 50 and the sensor chip 40 are mounted in a side-by-side relation on the bottom wall 21, and are electrically connected to each other by means of bonded wires. The IC module 50 is mounted on a lead frame 60 with a plurality of leads 61 to 68 which, as shown in FIG. 7, extend through the bottom wall 21 to define arrays of individual terminals 71 to 78 for connection with an external electric circuit which indicates or utilizes the detected pressure of the fluid. The arrays of the terminals 71 to 78 are exposed on opposite sides of the casing 20 with respect to a direction along which the IC module 50 and the sensor chip 40 are arranged.

Figure 8:
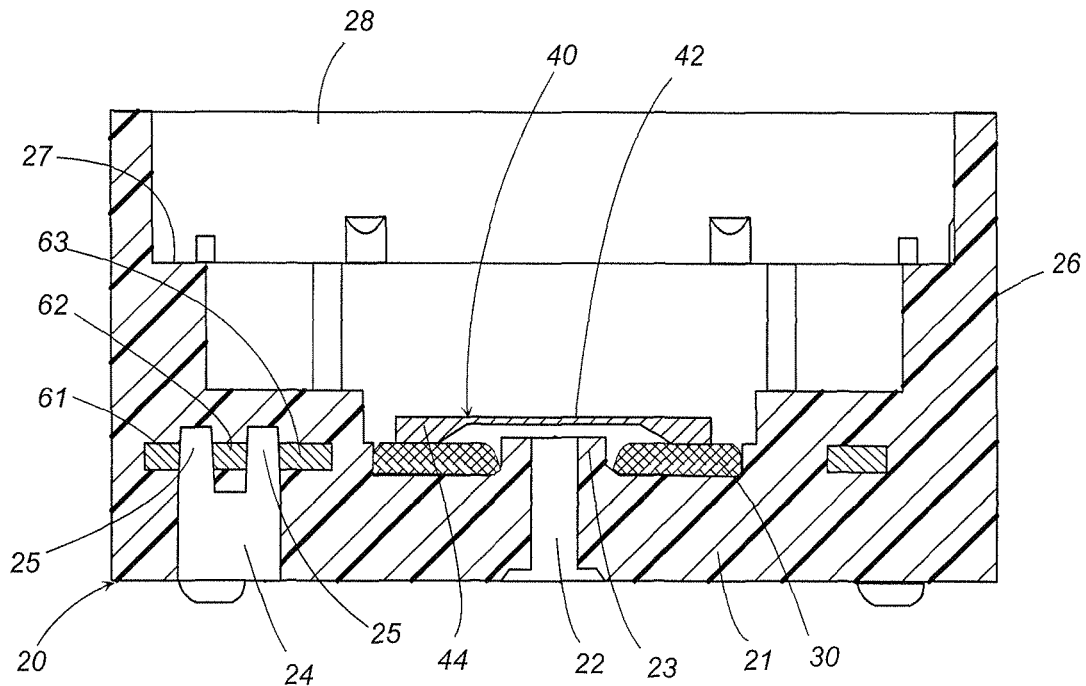
FIG. 8 is a cross-section taken along line 8-8 of FIG. 6.

As shown in FIG. 8, the sensor chip 40 is formed on its periphery with a downwardly projecting leg 44 at which the sensor chip 40 is fixed to the bottom wall 21 by means of a die bond adhesive 30, for example, a filler-impregnated silicone resin. The adhesive is placed around an air vent 22 which extends through the bottom wall 21 to expose the back of the diaphragm 42 to an outside atmosphere for releasing a back pressure of the diaphragm 42. Formed around the air vent 22 is a rim 23 which projects on the interior surface of the bottom wall 21 to define outwardly thereof a space for retaining the adhesive 30. Thus, the adhesive 30 is retained in position free from flowing into the air vent 22 for successfully fixing the sensor chip 40 to the bottom wall 21. The rim 23 is dimensioned to have a sufficient clearance on the back side of the diaphragm 42 so as not to impede a permissible deformation of the diaphragm 42.

After the sensor chip 40 is fixed to the bottom wall 21, and is electrically connected to the IC module 50, a junction coating resin (JCR) 34 is applied over the IC module 50, the sensor chip 40, and the leads, while sealing any gap possibly remaining between the individual leads and the bottom wall 21.

As best shown in FIGS. 7 and 8, due to the compact arrangement of the package, it is required to pass some of the leads through a narrow region aside the sensor chip 40. The leads are those 61 to 63 extending in parallel with each other around the sensor chip 40 from the IC module 50 to the terminals 71 to 73 located adjacent thereto. In order to electrically isolate the parallel leads 61 to 63 within the narrow region as well as to leave no gap between the leads and the bottom wall 21 when molding in the leads in the bottom wall or the casing 20, the bottom wall 21 is designed to have a recess 24 for receiving a forked jig when molding in the leads or the lead frame 60 in the casing 20, as best shown in FIG. 8. The forked jig is utilized to engage with the parallel leads 61 to 63 for keeping them in a predetermined spaced relation as well as pressing the leads towards a complementary portion of a molding die, thereby avoiding the individual leads from being offset laterally by a mold flow in the die as well as avoiding the occurrence a gap between the leads and the molded bottom wall 21. The recess 24 resulting from the removal of the jig is therefore shaped to have tapered trenches 25 extending between the adjacent leads, as shown in FIG. 8.

Turning back to FIG. 3, the probe tube 80 is formed to have a fluid channel 84 extending along its axis, and is formed at its lower end with an outwardly extending flange 82 which is fitted within the top opening of the casing 20 and is secured thereto by means of a sealer 88. The casing 20 is formed in the interior surface of the side wall 26 with a stepped shoulder 27 which bears the flange 80. The sealer 88 is applied around the flange 82 in order to sealingly bond the flange 82 to the side wall with a sealing plate 90 interposed between the flange 82 and the stepped shoulder 27. The sealing plate 90 is formed of a thin metal plate to seal the connection between the flange 82 and the shoulder 27, and is formed to have a center opening 94 coaxial with the fluid channel 84 for introducing the fluid into the casing 20 to make the fluid into contact with the sensor chip 40.

Figure 9A:
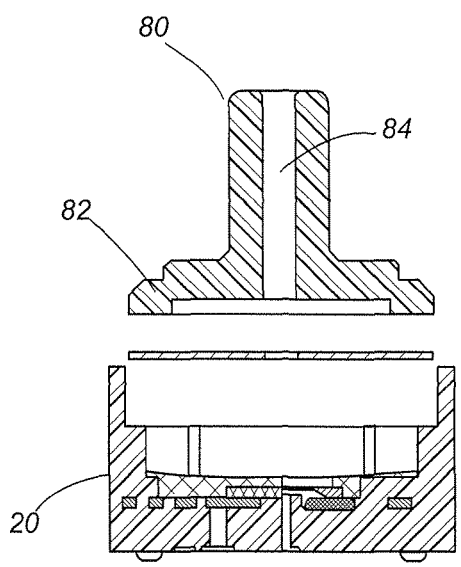
FIGS. 9A and 9B are sectional views of the above sensor packages respectively assembled with different probe tubes.
Figure 9B:
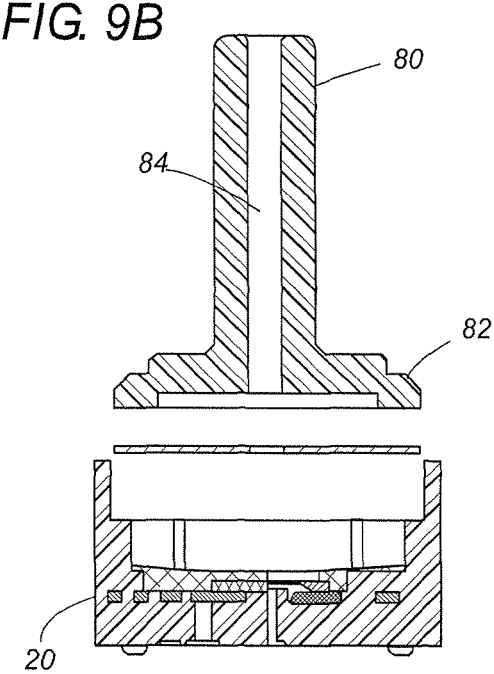

As the probe tube 80 is formed as a separate member from the casing to be retrofitted thereto, the casing 20 equipped with sensing circuit components can serve as a common base for various types of the probe tubes having different length and/or diameters, as shown in FIGS. 9A and 9B, thereby enabling to assemble the sensor package of an optimum configuration for an actual application environments.

Figure 10:
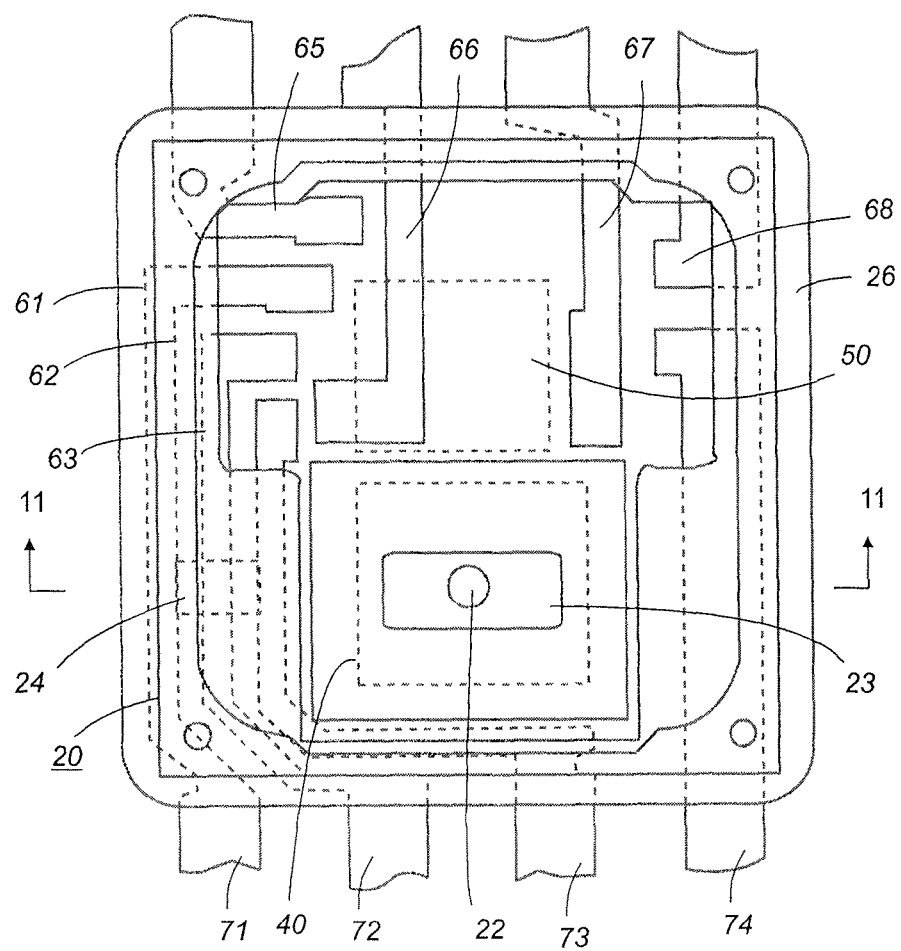
FIG. 10 is a top view of the casing in accordance with a modification of the above embodiment.
Figure 11:
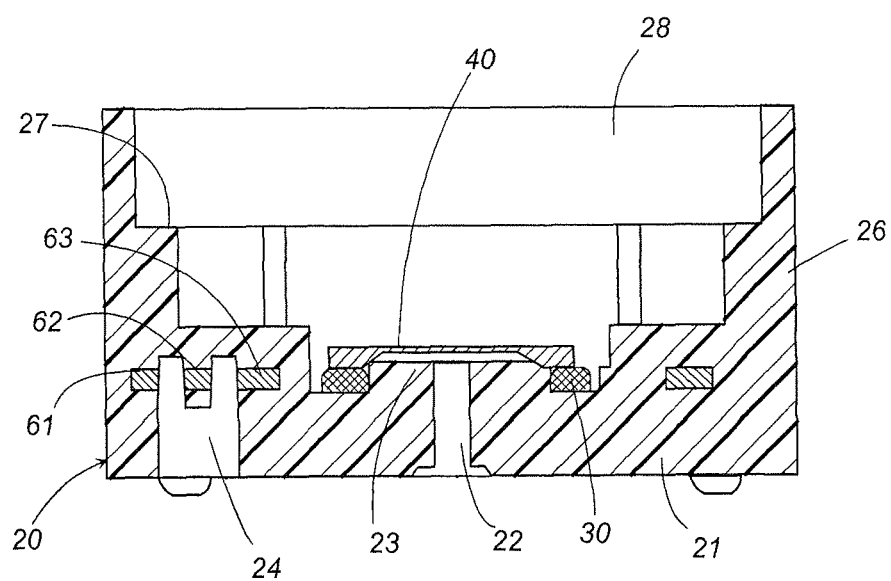
FIG. 11 is a cross section taken along 11-11 of FIG. 10.

FIGS. 10 and 11 illustrate a modification of the above embodiment which is identical to the above embodiment except that the rim 24 is shaped to have a rectangular top face analogous to the sensor chip 40. Like parts are designated by like reference numerals and no duplicate explanation is deemed necessary. The rectangular rim 24 is responsible for locating the space for the adhesive 30 just below the legs 44 of the sensor chip 40, thereby facilitating the adhesion of the sensor chip 40 to the bottom wall 22.

Figure 12:
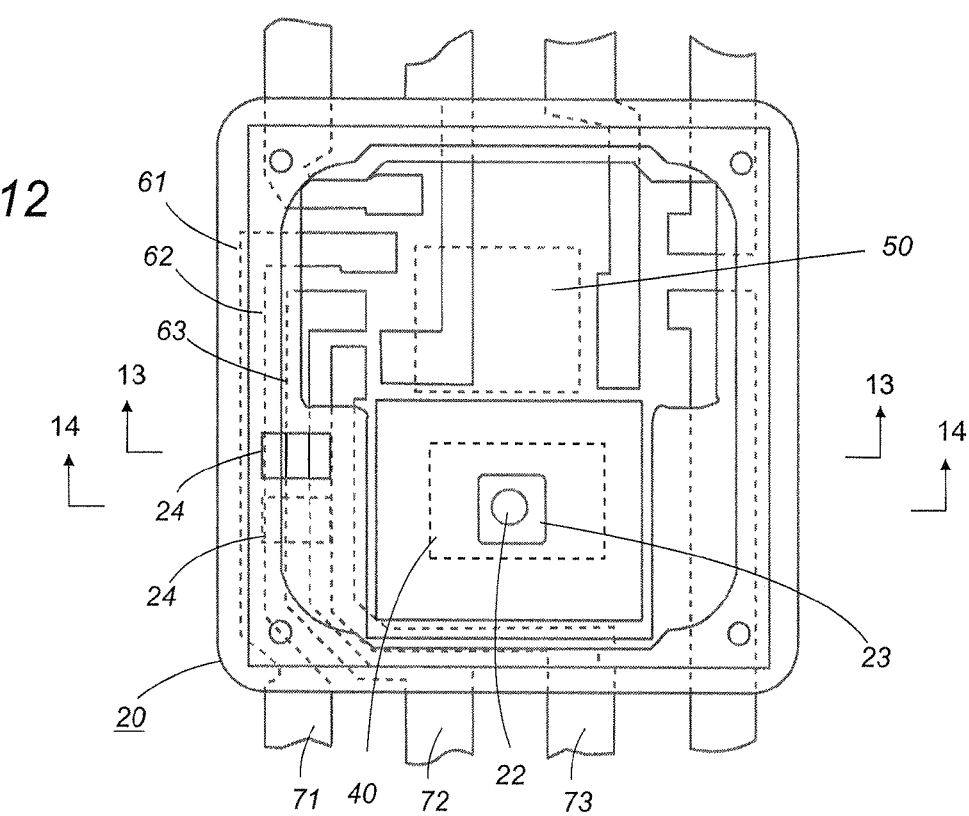
FIG. 12 is a top view of the casing in accordance with a another modification of the above embodiment.
Figure 13:
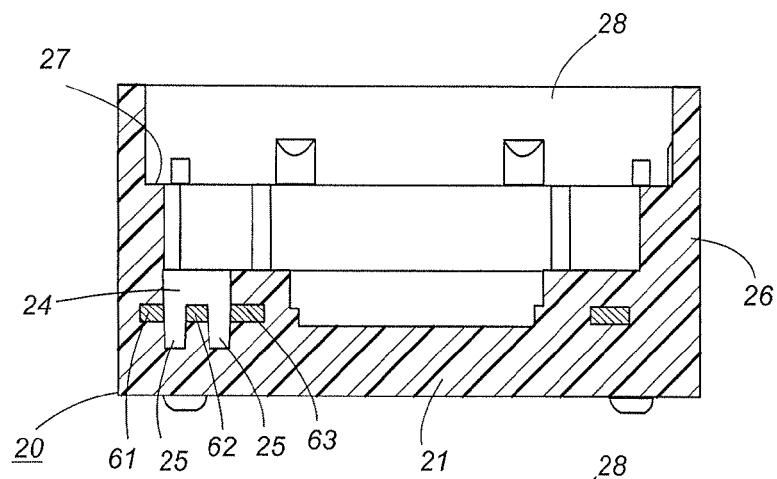
FIG. 13 is a cross-section taken along line 13-13 of FIG. 12.
Figure 14:
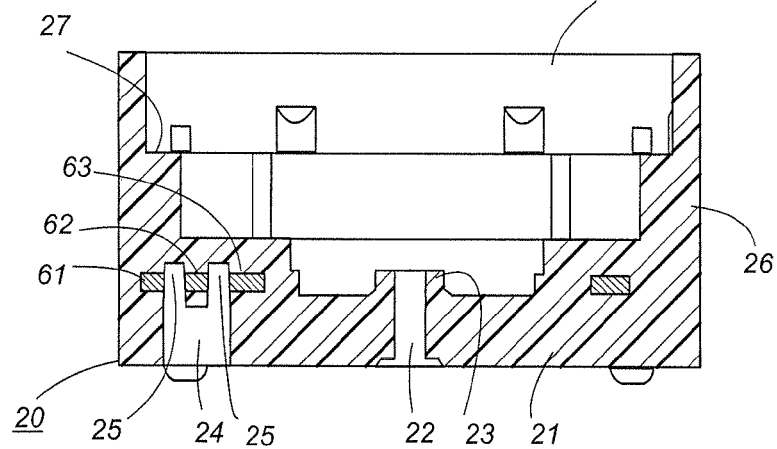
FIG. 14 is a cross-section taken along line 14-14 of FIG. 12.

FIGS. 12 to 14 illustrate another modification of the above embodiment which is identical to the above embodiment except that the bottom wall 22 is formed with two recesses 27 spaced along the length of the leads 61 to 63, one being open to the interior of the casing, and the other being open to the exterior of the casing. With this design, the leads of relatively long dimension can be successfully prevented from being offset laterally. Further, the forked jig associated with one of the recesses 27 acts to press the leads upwardly towards a portion of the molding die, while the forked jig associated with the other recess acts to press the leads downwardly towards another portion of molding die. Thus, the leads 61 to 63 can be also prevented from being offset vertically from the intended position during the molding of the casing, and can be therefore held in position.

Figure 15:
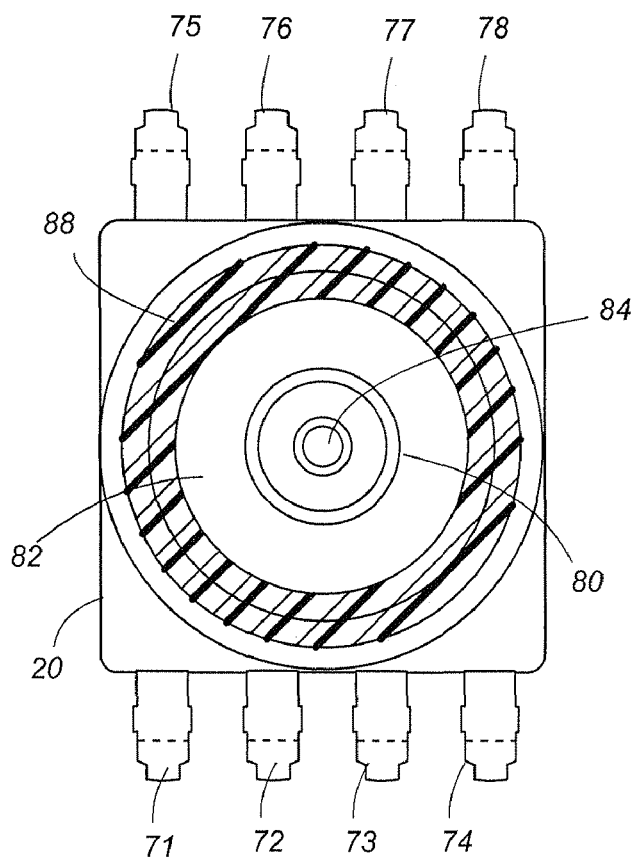
FIG. 15 is a top view of a fluid pressure sensor package in accordance with a second embodiment of the present invention.
Figure 16:
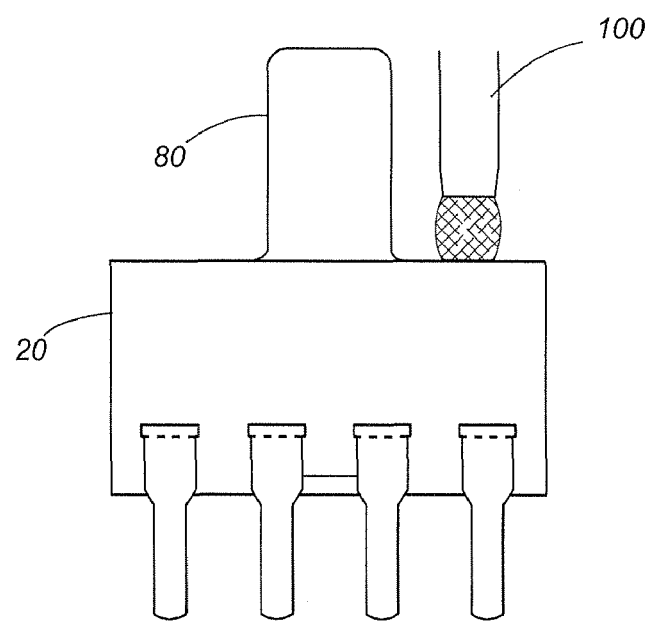
FIG. 16 is a schematic view illustrating a manner of making a seal bonding of the probe tube to the casing.

FIGS. 15 and 16 illustrate a fluid pressure sensor package in accordance with a second embodiment of the present invention which is basically identical to the above embodiment except that the casing 20 is shaped to have a circular top opening to receive the circular flange of the probe tube. With this structure, a fixed dispenser 100 can be utilized to apply the sealer around the periphery of the flange while rotating the casing 20 about its vertical axis, thereby facilitating the assembly of the sensor packages. Like parts are designated by like reference numerals and no duplicate explanation is deemed necessary.

The invention claimed is:

1. A fluid pressure sensor package comprising:
 a sealed casing;
 a sensor chip accommodated in said casing for sensing a pressure of a fluid introduced into said casing, said sensor chip being formed of a semiconductor substrate to give a diaphragm and a sensing element;
 a probe tube extending from said casing and having a fluid channel for introducing the fluid into contact with said diaphragm;
 wherein said casing is formed to have a bottom wall and a side wall which extends from the circumference of said bottom wall to define a top opening at an upper end of said casing, said side wall being formed on its interior surface with a stepped shoulder, and
 said probe tube is formed at its one end with a flange which is fitted within said top opening of the casing and rests on said stepped shoulder,
 said flange being sealingly bonded to the side wall of the casing by a sealer, and
 wherein said sensor chip is bonded to the bottom wall of said casing by means of an adhesive,
 said bottom wall is formed with an air vent which communicates the diaphragm with an outside atmosphere for releasing a back pressure of the diaphragm, and
 said bottom wall is formed on its interior surface with a rim surrounding said air vent to define a space therearound for receiving therein said adhesive.

2. A fluid pressure sensor package as set forth in claim 1, wherein
 said rim is shaped to have a planar contour which is analogous to that of said sensor chip.

3. A fluid pressure sensor package as set forth in claim 1, wherein
 said casing includes an IC module configured to process an output of said sensor chip and generate a signal indicative of the fluid pressure;
 said IC module and said sensor chip being arranged in side-by-side relation on said bottom wall along a first dimension of said casing,
 said casing is provided with a plurality of terminals which are arranged on opposite sides of the casing with regard to said first dimension and are electrically connected to said IC modules by means of individual leads partly embedded in the bottom wall,
 at least two of said terminals arranged adjacent to said sensor chip being electrically connected to said IC module by means of parallel leads which pass aside sensor chip in parallel relation with each other,
 said bottom wall is provided with a recess which is configured to isolate said parallel leads in a constant spaced relation from each other.

4. A fluid pressure sensor package as set forth in claim 3, wherein
 said bottom wall is provided with two said recesses spaced along the length of said parallel leads, one of said recess being open to the interior of the casing, and the other being open to the exterior of the casing.

5. A fluid pressure sensor package as set forth in claim 1, wherein
 said flange is shaped to have a circular circumference in conformity with the top opening of said casing.

6. A fluid pressure sensor package comprising:
 a sealed casing;
 a sensor chip accommodated in said casing for sensing a pressure of a fluid introduced into said casing, said sensor chip being formed of a semiconductor substrate to give a diaphragm and a sensing element;
 a probe tube extending from said casing and having a fluid channel for introducing the fluid into contact with said diaphragm;
 wherein said casing is formed to have a bottom wall and a side wall which extends from the circumference of said bottom wall to define a top opening at an upper end of said casing, said side wall being formed on its interior surface with a stepped shoulder, and
 said probe tube is formed at its one end with a flange which is fitted within said top opening of the casing and rests on said stepped shoulder,
 said flange being sealingly bonded to the side wall of the casing by a sealer, and
 wherein said casing includes an IC module configured to process an output of said sensor chip and generate a signal indicative of the fluid pressure,
 said IC module and said sensor chip being arranged in side-by-side relation on said bottom wall along a first dimension of said casing,
 said casing is provided with a plurality of terminals which are arranged on opposite sides of the casing with regard to said first dimension and are electrically connected to said IC modules by means of individual leads partly embedded in the bottom wall,
 at least two of said terminals arranged adjacent to said sensor chip being electrically connected to said IC module by means of parallel leads which pass aside said sensor chip in parallel relation with each other, and
 said bottom wall is provided with a recess which is configured to isolate said parallel leads in a constant spaced relation from each other.

7. A fluid pressure sensor package as set forth in claim 6, wherein
 said bottom wall is provided with two said recesses spaced along the length of said parallel leads, one of said recess being open to the interior of the casing, and the other being open to the exterior of the casing.

8. A fluid pressure sensor package as set forth in claim 6, wherein
 said flange is shaped to have a circular circumference in conformity with the top opening of said casing.

* * * * *